United States Patent [19]

Kikuchi et al.

[11] 4,169,026

[45] Sep. 25, 1979

[54] ETCHANT FOR ELECTROLYTIC ETCHING OF A FERRITE FOR A MAGNETIC HEAD AND METHOD OF PRODUCING A MAGNETIC HEAD

[75] Inventors: Tatsuro Kikuchi, Kyoto; Kenichi Fujimura, Katano; Hyogo Hirohata, Neyagawa; Tetsuo Hino, Hirakata, all of Japan

[73] Assignee: Matsushita Electric Industrial Co., Ltd., Japan

[21] Appl. No.: 923,403

[22] Filed: Jul. 10, 1978

Related U.S. Application Data

[63] Continuation of Ser. No. 818,345, Jul. 22, 1977, abandoned.

[30] Foreign Application Priority Data

Jul. 23, 1976 [JP] Japan ................. 51-88590

[51] Int. Cl.² ............................ C25F 3/02; C25F 3/14
[52] U.S. Cl. ........................ 204/129.65; 204/129.75; 204/129.95
[58] Field of Search ........... 204/129.65, 129.8, 129.85, 204/129.95, 129.75, 129.35

[56] References Cited

U.S. PATENT DOCUMENTS

| | | | |
|---|---|---|---|
| 2,645,635 | 7/1953 | Walton | 204/129.85 |
| 3,342,711 | 9/1967 | Shiga et al. | 204/129.95 |
| 3,485,731 | 12/1969 | Yokozawa | 204/129.85 |
| 3,507,759 | 4/1970 | Shaw | 204/129.95 |

*Primary Examiner*—T. M. Tufariello
*Attorney, Agent, or Firm*—Wenderoth, Lind & Ponack

[57] ABSTRACT

An etchant comprising an electrolytic liquid which comprises sulfuric acid as a main component and water in such amount that the weight ratio of sulfuric acid to water is between 9:1 and 2:1. The ferrite surface having been electrolytically etched by using this etchant is smooth. Thus, this etchant makes it possible to etch a ferrite to a large depth, and thereby easily shape a ferrite by electrolytic etching, e.g. to define the track width of a magnetic head.

6 Claims, 42 Drawing Figures

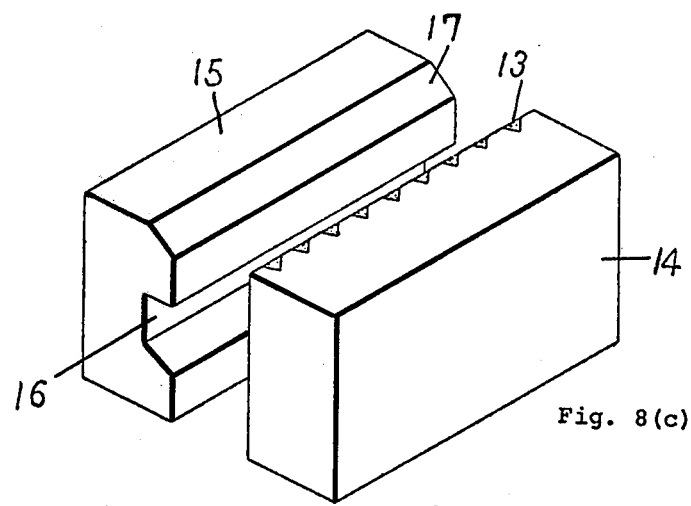
Fig. 8(c)
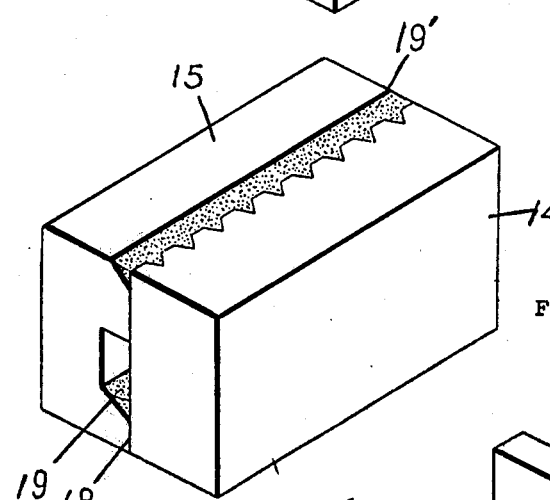
Fig. 8(d)
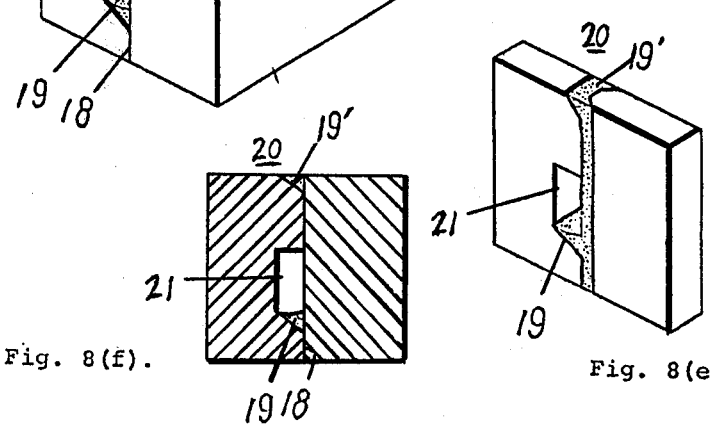
Fig. 8(f).
Fig. 8(e)

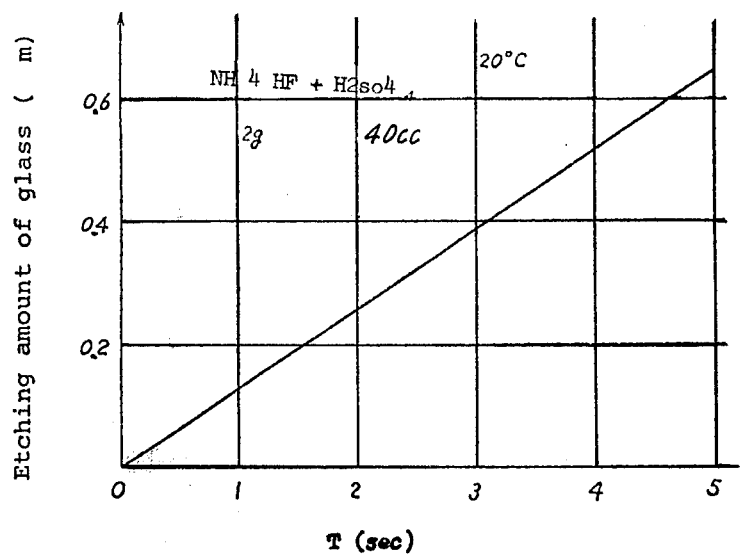
Fig. 11
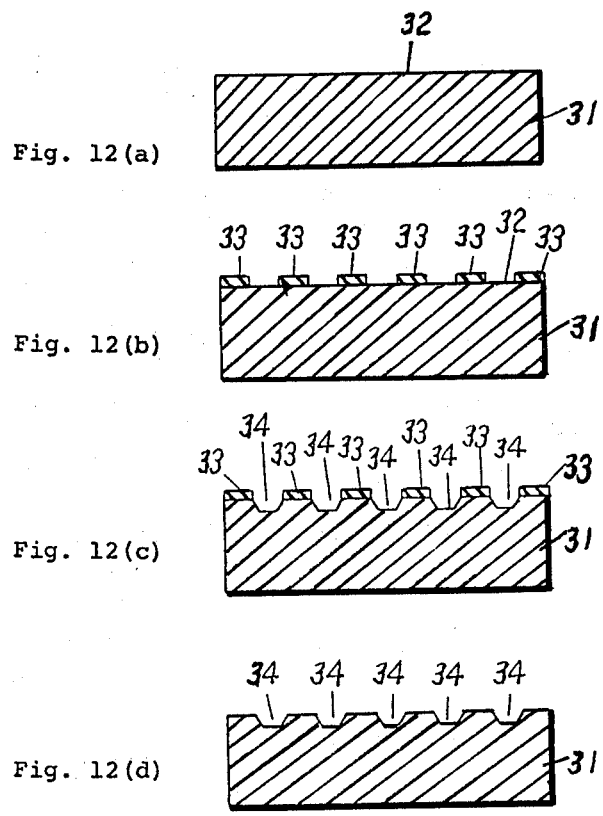
Fig. 12(a)
Fig. 12(b)
Fig. 12(c)
Fig. 12(d)

ETCHANT FOR ELECTROLYTIC ETCHING OF A FERRITE FOR A MAGNETIC HEAD AND METHOD OF PRODUCING A MAGNETIC HEAD

This is a continuation of application Ser. No. 818,345, filed July 22, 1977 abandoned.

This invention relates to an etchant for electrolytic etching of a ferrite for a magnetic head and method of producing a magnetic head by using the etchant.

When ferrite materials are machined to form e.g. a magnetic head, deformed layers are produced on the ferrite materials by the machining. It is known that these deformed layers very badly affect the magnetic properties of the resultant magnetic head.

Conventionally, it has been attempted to remove such deformed layers by chemical etching using e.g. phosphoric acid and hydrochloric acid or electrolytic etching using e.g. phosphoric acid and chromic anhydride. However, the ferrite surface having been chemically or electrolytically etched by using such etchants is rather rough, and becomes rougher as the amount of etching increases, resulting in a serious deterioration of resultant magnetic properties.

Therefore, according to prior art, the deformed layers on the ferrite materials cannot be skillfully removed, and it is impossible to etch away a ferrite to a large depth of the ferrite. So, according to prior art, it is unlikely to think of variously shaping a ferrite of a magnetic head by a large amount etching.

It is an object of this invention to provide an etchant for electrolytic etching of a ferrite for a magnetic head, by which the ferrite can be etched in a large etching amount, leaving a smooth surface of the ferrite.

This object is achieved according to this invention by providing an etchant for electrolytic etching of a ferrite for a magnetic head, comprising an electrolytic liquid which comprises sulfuric acid as a main component and water in such amount that the weight ratio of sulfuric acid to water is between 9:1 and 2:1. By this etchant, the ferrite can be etched to produce a smooth surface, and thus the ferrite can be etched to a precise dimension.

The etchant can consist essentially of sulfuric acid and water, but the etchant can also contain a further acid. Thus, the etchant can consist essentially of sulfuric acid, water and not more than 53 weight percent of phosphoric acid; or not more than 35 weight percent of glycolic acid; or not more than 7 weight percent of hydrochloric acid; or not more than 67 weight percent of acetic acid; or not more than 2 weight percent of oxalic acid; or not more than 5 weight percent of tartaric acid; or not more than 20 weight percent of nitric acid; or not more than 33 weight percent of perchloric acid; or not more than 54 weight percent of formic acid.

In such etchants of this invention, sulfuric acid is likely to damage etching resists. When such etchants are required to be used in cooperation with etching resists, it is preferred according to this invention to include, in each etchant, 1/6 to 3 weight parts of an additive selected from glycerine, ethyleneglycol, dioxane and triethylenetetramine on the basis of one weight part of the sulfuric acid.

It is another object of this invention to provide a method of producing a magnetic head, by which a precise track width can be easily defined. This object is achieved according to this invention by providing a method of producing a magnetic head, comprising: preparing a pair of ferrite blocks joined together by glass to form a magnetic gap therebetween; coating an etching resist on one surface of the joined pair of ferrite blocks to leave at least a part of the joint portion between the two ferrite blocks on said one surface uncoated with the etching resist; contacting the ferrite blocks with an etchant comprising an electrolytic liquid which comprises one of the compositions as described above and 1/6 to 3 weight parts of an additive selected from glycerine, ethyleneglycol, dioxane and triethylenetetramine on the basis of one weight part of said electrolytic liquid, so as to electrolytically etch said uncoated part of the joint portion of the two ferrite blocks on said one surface to partially remove the joint portion of the ferrite blocks and thereby define a magnetic track width of the magnetic head; and removing the etching resist. In this case, said one surface of the joined ferrite blocks can be the surface perpendicular to the working surface of the magnetic head or can be the surface involving the working surface of the magnetic head.

Details of this invention will be described hereinafter with the aid of the drawings, in which.

Figure 5A:
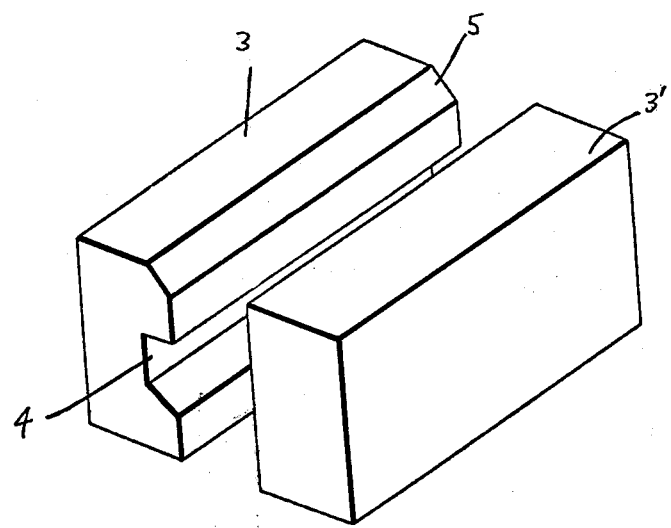
Figure 5B:
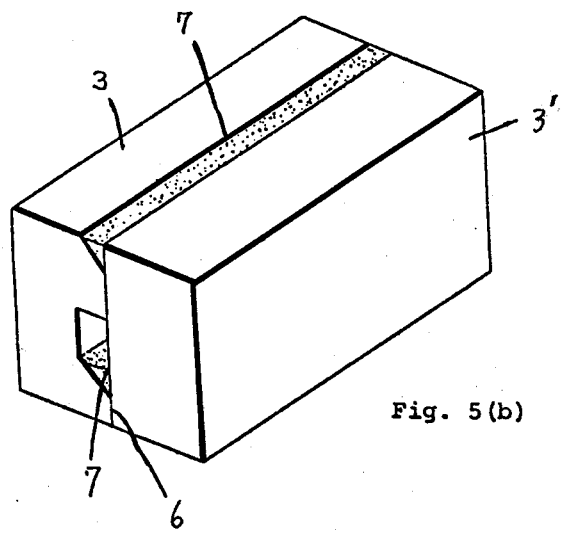
Figure 5C:
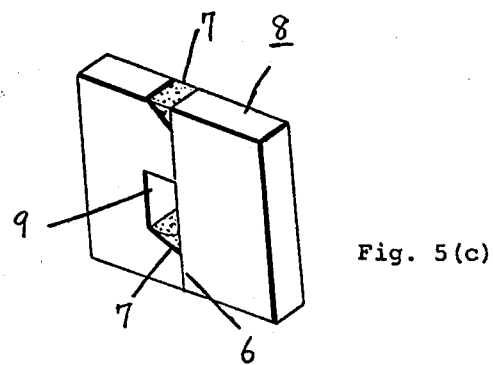
Figure 6:
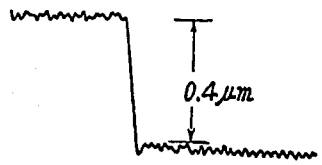
Figure 7:
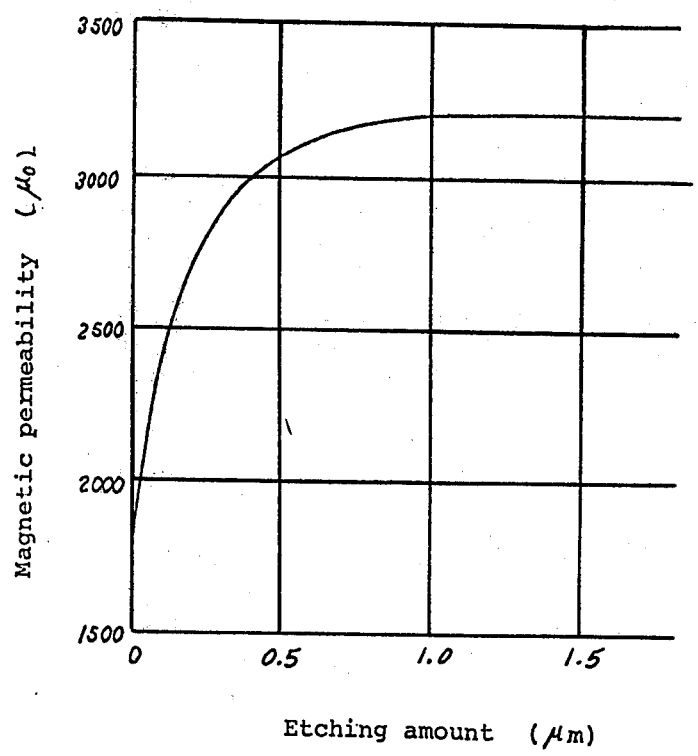
Figure 9:
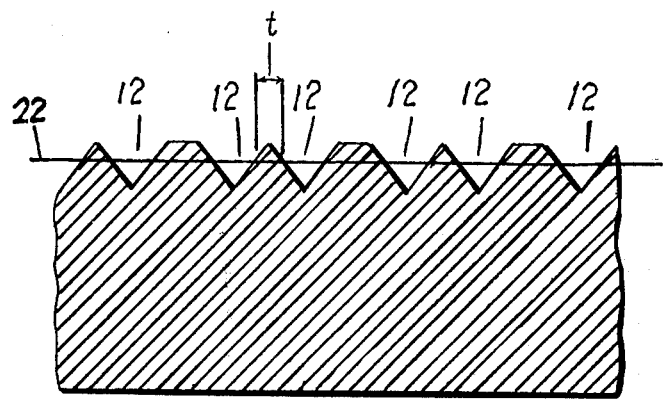
Figure 10A:
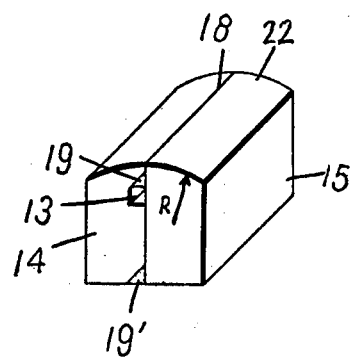
Figure 10B:
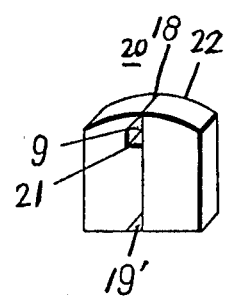
Figure 16:
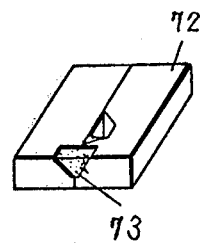
Figure 17A:
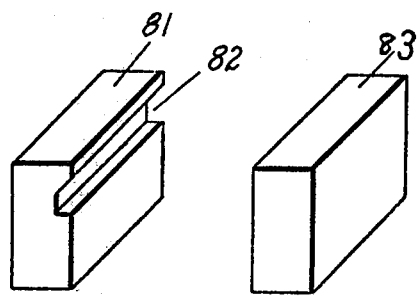
Figure 17B:
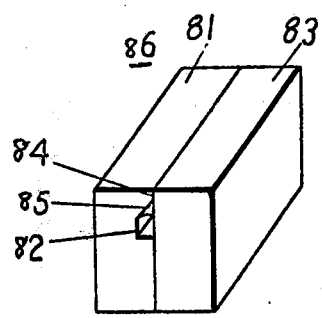
Figure 17C:
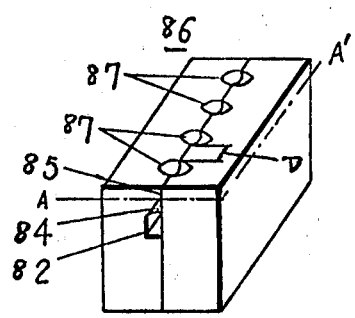

FIGS. 5(a), 5(b) and 5(c) are perspective views of ferrite blocks depicting the usual method of producing a magnetic head to which the etchant and the method of this invention are to be applied;

FIG. 6 is a curve schematically depicting the difference of the surface roughness of the ferrite between before and after the electrolytic etching using the etchant of this invention;

FIG. 7 is a graph depicting the relation between the magnetic permeability of a ferrite and the amount of the etching;

FIGS. 8(a) to 8(f) are perspective views of ferrite blocks depicting one example of how the etchant and the method of this invention are to be applied to the production of a magnetic head;

FIG. 9 is a cross-sectional view of a ferrite block depicting one example of how to control or define the track width of a magnetic head;

FIGS. 10(a) and 10(b) are perspective views of ferrite blocks depicting one example of how the etchant of this invention is to be applied to the production of a magnetic head;

FIG. 11 is a graph depicting the relation between the etching amount of the glass in a glass-ferrite combination by using the chemical etchant to etch only glass and the etching time;

FIGS. 12(a) to 12(d), 13(a), 13(b) and 14 are perspective views of ferrite blocks depicting how the ferrite blocks are shaped by using the etchant and the method of this invention;

FIGS. 15(a) to 15(l) are perspective views or cross-sectional views of ferrite blocks depicting an example of how the etchant and the method of this invention are to be applied to the production of a magnetic head;

FIG. 16 is a perspective view of an example of a magnetic head core having been treated by the etchant and the method of this invention; and FIGS. 17(a) to 17(c) are perspective views of ferrite blocks depicting an example of how the etchant and the method of this invention are to be applied in the production of a magnetic head for defining or controlling the track width.

It has been discovered according to this invention that when the electrolytic etchant comprises sulfuric acid and water in such amount that the weight ratio of sulfuric acid to water is between 9:1 and 2:1, the ferrite such as manganese-zinc ferrite and nickel-zinc ferrite can be electrolytically etched with the ferrite surface being kept smooth, and that the etchant can further comprise an additive acid taken from not more than 53 weight percent of phosphoric acid, not more than 35 weight percent of glycolic acid, not more than 7 weight percent of hydrochloric acid, not more than 67 weight percent of acetic acid, not more than 2 weight percent of oxalic acid, not more than 5 weight percent of tartaric, not more than 20 weight percent of nitric acid, not more than 33 weight percent of perchloric acid, and not more than 54 weight percent of formic acid.

Here, each acid is regarded as being pure. That is, in practice, pure sulfuric acid not containing water, for example, is not available. The sulfuric acid aqueous solution actually used had 5 weight percent of water included therein. So, this sulfuric acid aqueous solution is regarded as consisting of 95 weight percent of sulfuric acid and 5 weight percent of water. This way of measuring the amounts of acids applies to other acids, too.

Further, the combination of water and one or more of the acids is designated as an electrolytic liquid. This is to distinguish the electrolytic liquid from the additive as described below.

That is, it has been discovered according to this invention that when the electrolytic etchant comprises an additive taken from glycerine, ethyleneglycol, dioxane and triethylenetetramine in addition to the electrolytic liquid in such amount that the amount of the additive is 1/6 to 3 weight parts on the basis of one weight part of sulfuric acid, the etching resist (when used) can be prevented from being damaged by the sulfuric acid.

Experiments were performed as follows. Various etchants were prepared. A ferrite (typically manganese-zinc ferrite or nickel-zinc ferrite) partially coated with an etching resist was placed in one of the etchants kept at room temperature. And then, electrolytic etching was performed in the etchant by applying an appropriate D.C. voltage between the ferrite as an anode and a stainless steel plate as a cathode. After the electrolytic etching, the etched ferrite was checked to determine the etching speed, the roughness of the resultant etched ferrite surface and the stability of the etching resist.

Such experiments were carried out by using respective one of the other etchants also. Table 1 shows typical results of such experiments. Table 2 shows typical results, for comparison, obtained by chemical etching which was performed by using hydrochloric acid as a chemical etchant.

From the results obtained by the above experiments, typical examples of which are shown in Table 1, it was found that the presence of sulfuric acid in an appropriate amount in the electrolytic etchant can effectively prevent the ferrite surface from being roughly etched. If the weight ratio of sulfuric acid to water is larger than 9:1, the etching speed becomes undesirably low. On the other hand, if the weight ratio of sulfuric acid to water is smaller than 2:1, the resultant surface of the etched ferrite becomes undesirably rough. It was further found that the presence of an appropriate additive such as glycerine in an appropriate amount can effectively prevent the etching resist from being damaged by the sulfuric acid in the etchant. If the weight ratio of the additive to sulfuric acid is larger than 3:1, the etching speed becomes undesirably low. On the other hand, if the weight ratio of the additive to sulfuric acid is smaller than 1:6, the effect of the additive addition becomes faint.

The surface of the resultant etched ferrite by using the etchant of this invention with or without the additive is very smooth and lustrous. On the other hand, the resultant ferrite surface etched by using a chemical etchant such as hydrochloric acid as shown in Table 2 is very rough regardless of the etching speed.

Figure 1:
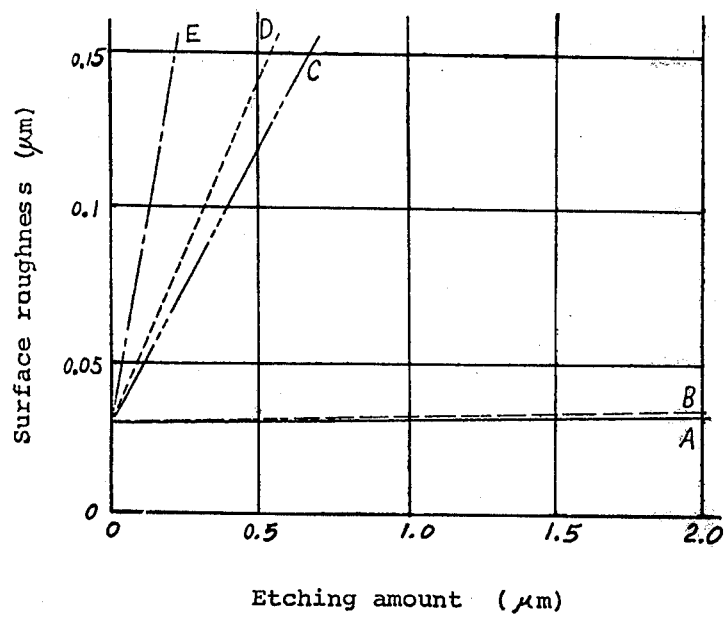
FIG. 1 is a graph depicting the relationship between the amount of etching (depth of the etched surface relative to the surface level before the etching) and the roughness of the resultant etched surface.

FIG. 1 depicts the relationship between the etching amount and the resultant surface roughness of a ferrite. Curves A to D represent the results obtained by using an electrolytic etching technique. Curve A represents the case where the etchant consists of 50 volume percent of sulfuric acid aqueous solution (containing 95 weight percent of sulfuric acid) and 50 volume percent of phosphoric acid aqueous solution (containing 85 weight percent of phosphoric acid), the applied voltage between the anode and the cathode is 10 V, the anode (ferrite) current density is 50 to 70 mA/cm$^2$, and the etchant temperature is 20° C. Curve B represents the case where the etchant consists of 50 volume percent of sulfuric acid aqueous solution (containing 95 weight percent of sulfuric acid) and 50 volume percent of perchloric acid aqueous solution (containing 60 weight percent of perchloric acid), the applied voltage is 8 V, the anode current density is 30 to 50 mA/cm$^2$, and the etchant temperature is 20° C. Curve C represents the case where the etchants consists only of phosphoric acid aqueous solution (containing 85 weight percent of phosphoric acid), the applied voltage is 3 V, the anode current density is 40 to 60 mA/cm$^2$, and the etchant temperature is 20° C. Curve D represents the case where the etchant consists only of perchloric acid aqueous solution (containing 60 weight percent of perchloric acid), the applied voltage is 3 V, the anode current density is 50 to 70 mA/cm$^2$, and the etchant temperature is 20° C.

On the other hand, curve E represents the case where the result is obtained by using a chemical etching technique, and the etchant contains 10 mol/l of hydrochloric acid. As apparent from FIG. 1, the electrolytic etching using an etchant containing an effective amount of sulfuric acid produces a very smooth etched surface of ferrite, regardless of the etching amount.

Figure 2:
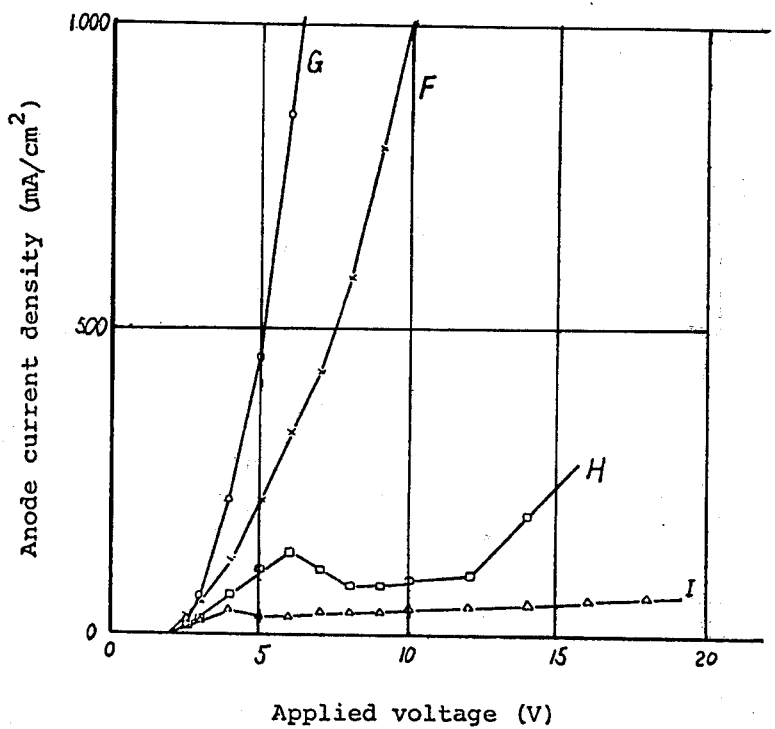
FIG. 2 is a graph depicting the relationship between the applied voltage for electrolytic etching and the anode current density with respect to several etchants.

FIG. 2 shows the relation between the applied voltage and the anode current density with respect to four kinds of etchants. Curve F represents the case where the etchant consists only of a phosphoric acid aqueous solution (containing 85 weight percent of phosphoric acid). Curve G represents the case where the etchant consists only of a perchloric acid aqueous solution (containing 60 weight percent of perchloric acid). Curve H represents the case where the etchant consists of 50 volume percent of sulfuric acid aqueous solution (containing 95 weight percent of sulfuric acid) and 50 volume percent of phosphoric acid aqueous solution (containing 85 weight percent of phosphoric acid). Curve I represents the case where the etchant consists of 50 volume percent of sulfuric acid aqueous solution (containing 95 weight part of sulfuric acid) and 50 volume percent of perchloric acid aqueous solution (containing 60 weight percent of perchloric acid). The etchant solution in each case is 20° to 25° C.

As apparent from FIG. 2, in the case of curves H and I in which sulfuric acid is used, the curves are not monotonous. The electrolytic etching becomes effective when the applied voltage exceeds the first peak point. That is, in the case of curve H, it is necessary that the applied voltage be not lower than 6 V, while in the case of curve I, the applied voltage should be not lower than 4 V, so as to resultantly obtain a smooth and lustrous etched ferrite surface.

Figure 3:
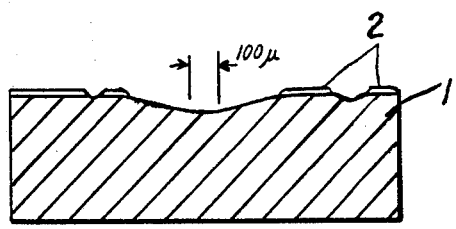
FIG. 3 and FIG. 4 are cross-sectional views of ferrites having been coated with etching resists and then having been subjected to electrolytic etching with different etchants, respectively.
Figure 4:
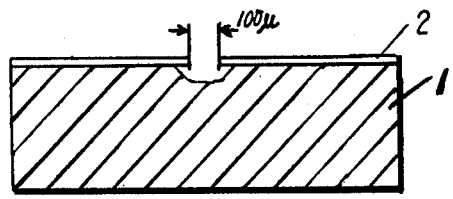

FIGS. 3 and 4 depict the resultant ferrite blocks 1 having been coated with photoresist 2 as an etching resist, leaving an uncoated portion having a width of 100 microns, and having then been subjected to electrolytic etching. The etchant used in the case of FIG. 3 consists of 50 volume percent of sulfuric acid aqueous solution (containing 95 weight percent of sulfuric acid) and 50 volume percent of phosphoric acid aqueous solution (containing 85 weight percent of phosphoric acid). The etchant used in the case of FIG. 4 consists of an electrolytic liquid which consists of 50 volume percent of sulfuric acid aqueous solution (containing 95 weight percent of sulfuric acid) and 50 volume percent of phosphoric acid aqueous solution (containing 85 weight percent of phosphoric acid), and an additive liquid which consists of one volume part of glycerine on the basis of one volume part of the sulfuric acid aqueous solution.

As apparent from FIGS. 3 and 4, it is necessary that the etchant include an additive such as glycerine when the etchant containing sulfuric acid is used in combination with the etching resist (the etching resist used here is not damaged by an etchant consisting only of the phosphoric acid aqueous solution), because otherwise the etching resist is damaged by the etchant, and thus the use of the etching resist becomes ineffective.

As apparent from the foregoing, by using the electrolytic etchant according to this invention, the ferrite material can be vary skillfully etched to remove the surface layer thereof (such as deformed layer produced by machining), leaving a smooth surface, which results in recovery of inherent magnetic properties of the ferrite material, which might have been deteriorated by the rough or deformed surface layer of the magnetic ferrite material.

Further, it is also apparent that if the etchant contains an appropriate amount of an additive such as glycerine, a smooth etched surface can be also obtained in the case of an etching-resist-coated ferrite, without damaging the etching resist. This indicates that fine shaping (cutting, engraving, etc.) of a ferrite becomes possible by using electrolytic etching technique with the aid of an etching resist.

Hereinbelow, an example of a method of producing a magnetic head using an electrolytic etchant for a ferrite for a magnetic head as given above will be described.

Referring to FIG. 5(a), a pair of magnetic ferrite blocks 3 and 3' are prepared. At least one of the two ferrite blocks (in this case ferrite block 3) has a groove 4 for a magnetic core window and a cut portion 5 to be used for enhancing the mechanical strength of the resultant magnetic head. As shown in FIG. 5(b), the two ferrite blocks are joined toghther to form a magnetic gap 6 and bonded together by a glass. The thus bonded block unit is sliced into a magnetic head core 8 as shown in FIG. 5(c). After the core 8 is shaped, a winding is wound on the head core 8 through the magnetic core window 9.

According to such method of producing a magnetic head, the ferrite blocks are subjected to various mechanical machinings such as cutting and grinding. By such machinings, deformed layers and residual strain (inner strain) are produced on the ferrite blocks. When the wavelength of the signal to be recorded on a magnetic tape is relatively long, the effect of such deformed layers or the like can be neglected. But if the wavelength of the signal to be recorded is short, e.g. 1 micron, the magnetic gap is required to have a narrow gap width such as a few tenths of micron, and in such case, the deformed layers or the like produced by the mechanical machinings seriously affect the magnetic properties of the magnetic ferrite. Likewise, when the track width is required to be narrow such as 10 microns for increasing the recorded signal density on a magnetic tape, the magnetic gap length is required to be short, and in such case, the deterioration of magnetic properties due to the mechanical machinings is serious.

Conventionally, the deformed layers are attemptedly removed by chemical etching, and the ferrite is annealed to remove the residual strain. However, chemical etching makes the ferrite surface rough. For example, when a polycrystalline Mn-Zn ferrite is polished by using a diamond paste and a tin rotary disc to attemptedly form a mirror surface, a deformed layer of a thickness of 0.2 to 0.3 micron is produced on the ferrite surface. If the deformed layer is chemically etched by using a chemical etchant such as hydrochloric acid, the etched surface is likely to have a roughness similar to the amount of the etching (depth of the etched surface relative to the original level of the surface before the etching). Therefore, the deformed layer cannot be removed by chemical etching without damaging the mirror surface of the ferrite unless the thickness of the deformed layer is very small. Further, the annealing of the ferrite is likely to cause the ferrite surface to get oxidized or reduced depending on the temperature and atmosphere, whereby the ferrite is thermally etched to have a rough surface.

The electrolytic etching by using the etchant according to this invention as described above can effectively remove the deformed layer, with the surface of the ferrite being kept smooth, in contrast to the case of the chemical etching or conventional electrolytic etching. The electrolytic etching is preferably carried out with the etchant temperature of less than 60° C. (more preferably 0° to 30° C.), applied voltage of not less than 5 V (more preferably between 5 and 25 V).

The relationship between the amount of etching and the resultant surface roughness of ferrite after the etching is already shown in FIG. 1. FIG. 6 depicts a typical example of the surface of the ferrite having been etched in an amount of 0.4 micron (relative to the non-etched surface) under the conditions represented by the curve A in FIG. 1. From FIG. 6, it is apparent that the electrolytic etchant according to this invention does not make the ferrite surface rough.

The relationship between the etching amount and the recovery of magnetic properties of the ferrite can be confirmed by testing e.g. the magnetic permeability ($\mu_0$) of a ring core made of the ferrite material. FIG. 7 shows the results of such testing, using a Mn-Zn ferrite (measured at 1 MHz). As apparent from FIG. 7, the magnetic permeability recovers as the etching amount of deformed layer increases. The effect of the etching already becomes remarkable when the amount of etching exceeds a few tenths of micron, and when it exceeds one micron, the magnetic property completely recovers.

The etching amount increases as the current density applied for the electrolytic etching increases, and also as the etching time increases. Therefore, the etching amount can be controlled by the etching time and the current density.

Figure 8A:
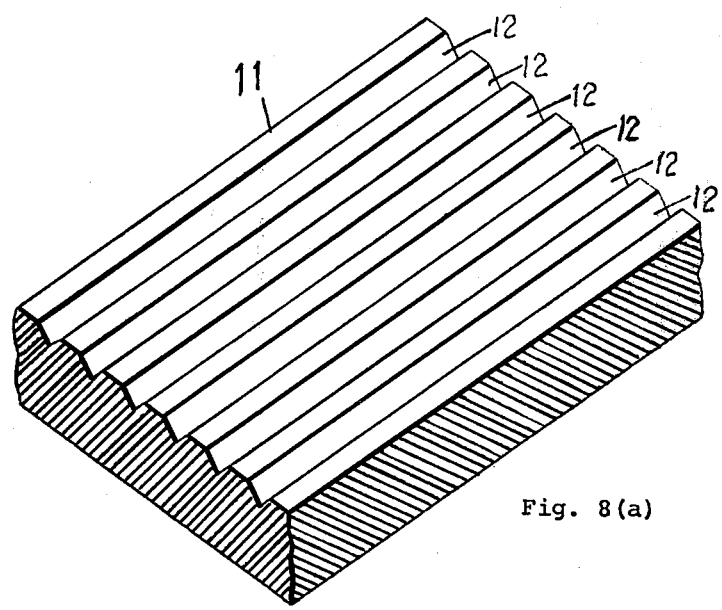
Figure 8B:
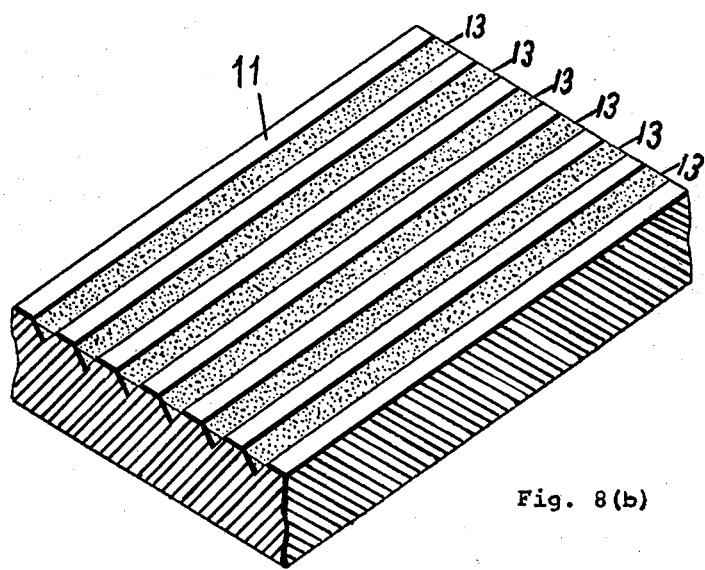

Another method for using the etchant of this invention will be described hereinafter with reference to FIG. 8(a) to 8(f). Referring to FIG. 8(a), a ferrite block 11 is mechanically ground on its entire surface, and is then ground by a diamond grinder to form plural parallel grooves 12. Then, the ferrite block is immersed in the etchant of this invention, and the electrolytic etching is performed. After the electrolytic etching, glass 13 is filled in the grooves 12 as shown in FIG. 8(b). Since the glass will not be etched by the electrolytic etching, the necessary amount of glass is then chemically etched by using e.g. hydrochloric acid, if such etching is necessary. If the chemical etching time is short, the ferrite surface does not become very rough.

Then, as shown in FIG. 8(c), the ferrite block is cut by a plane perpendicular to the length of the grooves 12 to form a ferrite block 14 for a pair of blocks, as shown in FIG. 8(c). A ferrite block 15 to be used for the other one of pair of blocks is also prepared as shown in FIG. 8(c). This ferrite block 15 has a groove 16 which will become a magnetic core window, and also has a cut portion 17 for enhancing the strength of the resultant head. This block 15 is also subjected to electrolytic etching so as to remove deformed layers.

Then, as shown in FIG. 8(d), the blocks 14 and 15 are joined together to form a predetermined magnetic gap 18, and are then bonded by glass 19 and 19'. The thus integrated block pair is cut by a plane perpendicular to the length of the groove 16 and passing the center of a groove 12 to form a head core 20, as shown in FIG. 8(e).

FIG. 8(f) depicts the cross-sectional view of the thus made head core 20. Reference numeral 21 designates a magnetic core window. After the head core 20 is shaped to a predetermined shape, the head core 20 is subjected to the electrolytic etching using the etchant of this invention, and loaded with a winding to form a magnetic head element.

In the above described process, the mechanical machinings to form the grooves 12 and 16 and to cut the blocks to form the head core 20 produce thick deformed layers. By the above electrolytic etching, such undesired layers can be removed.

FIG. 9 depicts a method for making the ferrite block 11. After grooves 12 are formed on the ferrite block 11, the ferrite block 11 is subjected to electrolytic etching so as to remove deformed layers. Then, the top portions of the walls of the grooves 12 are ground to the level of the broken line 22 so as to control the resultant magnetic gap length (i.e. control the resultant track width). If necessary, this grinding can be carried out before the electrolytic etching.

As described above, by using the electrolytic etching step or steps using the etchant of this invention in the production of a magnetic head, an excellent magnetic head can be produced.

Another method of using the etchant of this invention will be described below with reference to FIGS. 10(a) and 10(b) and FIGS. 8(a) to 8(d). An integrated pair ferrite blocks 14 and 15 as shown in FIG. 8(d) are prepared in the manner as described above. Then, the integrated block pair is shaped by using a diamond grinder to form a tape working surface 22, and the surface 22 is then polished to a mirror surface by using a diamond paste, etc. Thereafter, the integrated block pair is subjected to electrolytic etching using the etchant of this invention so as to remove deformed layers produced by the mechanical machinings. Then, the block pair is cut to form a head core 20 as shown in FIG. 10(b). Reference numeral 21 designates a magnetic core window. A winding is then wound on the magnetic core to form a magnetic head.

In this case, when the tape working surface is to be electrolytically etched, it is preferred that other parts of the ferrite block be covered with an etching resist.

If only the glass is required to be etched, a chemical etchant comprising a fluoride and an acid can advantageously be used. Examples of the fluorides are hydrogen fluoride, ammonium fluoride, aluminum sodium fluoride and ammonium bifluoride. Examples of acids in this case are sulfuric acid and hydrochloric acid.

FIG. 11 shows the relation between the etching amount of glass and the etching time when the chemical etchant used consists of 2 grams of ammonium bifluoride and 40 ml of sulfuric acid aqueous solution (95 weight percent of sulfuric acid).

Referring back to FIG. 9, the track width is defined by mechanical grinding. However, by such mechanical grinding, it is difficult to produce, at one time, many magnetic gap lengths in one ferrite block (track width) which have the same length t or all of which are precisely controlled.

However, by effectively electrolytic using the etchant of this invention, such disadvantage can be eliminated.

FIGS. 12(a) to 12(d) depict an example of such effective use of an electrolytic etchant. Referring to FIG. 12(a), the surface 32 of a ferrite block 31, which eventually becomes a joint surface with an opposing ferrite block, is polished by using e.g. a diamond paste to form a mirror surface, and is then electrolytically etched to remove deformed layers on the polished surface. The etching amount necessary in this case is a few tenths of a micron to a few microns. Then, as shown in FIG. 12(b), etching resist layers 33 corresponding to necessary (predetermined) magnetic gap lengths (track widths) are coated on the etched surface of the ferrite block 31. A photo-resist can advantageously be used as this etching resist. By immersing the thus treated ferrite block in an etching resist of this invention and performing electrolytical etching, the uncoated portions 34 of the ferrite surface are etched to form parallel grooves, as shown in FIG. 12(c). Thereafter, the etching resist layers 33 are removed to form a ferrite block having parallel grooves 34. By using this ferrite block, a magnetic head can be made in a manner as described above by using, if necessary, an additional electrolytic etching.

According to this method, the track widths can be precisely controlled. The etching amount can be easily controlled by controlling the current density and the etching time. If the current density is kept constant, the etching amount increases in linear relation to the etching time.

Figure 13A:
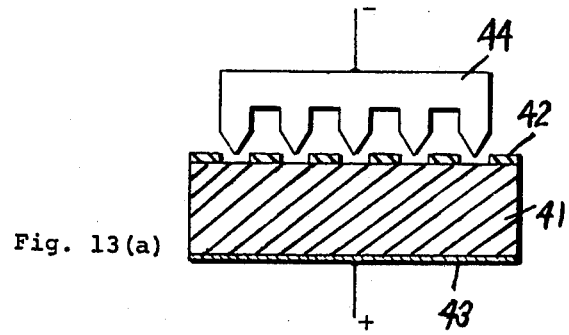
Figure 13B:
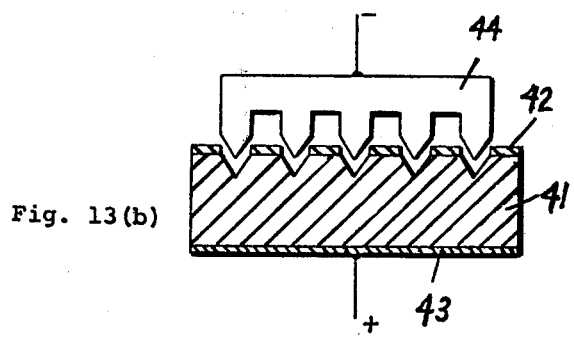

The end portion of the cathode to be used for the electrolytic etching can be a flat end or can be a convex shape corresponding to the concave shape of the groove 34. By using the cathode of convex shape, the current density at the ferrite portion to be etched can be increased, and the desired groove shape can be easily formed. This is apparent from FIG. 13(a) and 13(b). As shown in FIG. 13(a), the cathode electrode 44 is placed near the ferrite 41 which is to be etched, and which has etching resist layers 42. As the etching proceeds, the electrode 44 is brought closer to the ferrite 41, and thereby, the desired grooves or concaves can be easily formed at the surface of the ferrite 41, as shown in FIG. 13(b).

Figure 14:
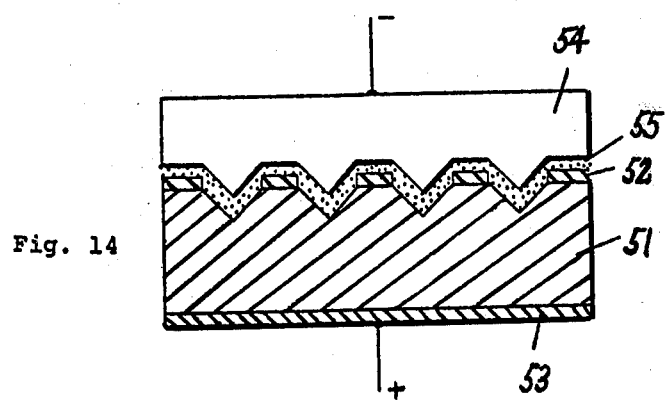

Further, as shown in FIG. 14, the electrolytic etchant can advantageously have a grinding powder 55 dispersed therein. By electrolytically etching the ferrite block 51 with etching resist layers 52 in the etchant having a grinding powder 55 dispersed therein with the cathode 34 being moved up and down, the etching efficiency can be increased.

Hereinafter, typical examples of the method of producing magnetic heads according to this invention will be described.

Figure 15A:
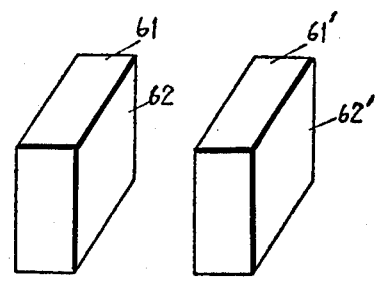

Referring to FIG. 15(a), a pair of ferrite blocks 61 and 61' are prepared. The surfaces 62 and 62' of the blocks to become joint surfaces to join the two blocks are polished to mirror surfaces, and are then subjected to the electrolytic etching, as described above, for removing the deformed surfaces of the ferrite blocks.

Figure 15B:
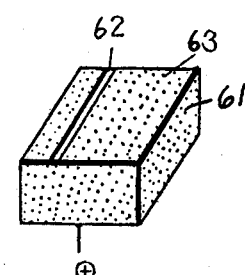
Figure 15C:
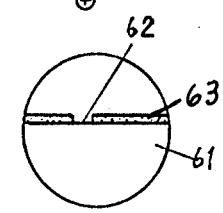
Figure 15D:
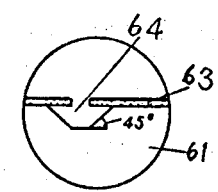
Figure 15E:
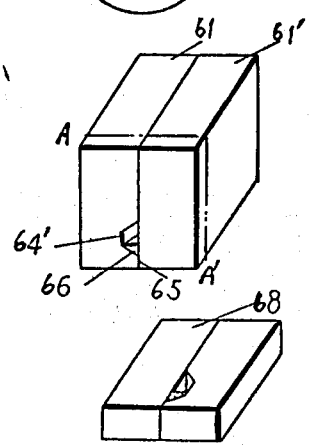
Figure 15F:
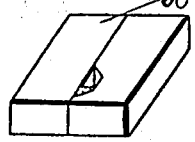

Then, as shown in FIG. 15(b), one ferrite block 61 is supplied with an electrode at a surface thereof opposite to the joint surface 62 thereof. The joint surface 62 is coated with etching resist layers 63 to leave uncoated portion extending in the direction of the length of the ferrite block 61, as shown in FIG. 15(b) and 15(c). By subjecting this ferrite block 61 to electrolytic etching, a groove 64 is formed at the joint surface of the ferrite block. This groove will function as a core window in the resultant magnetic head. The cross-section of the groove 64 cut by a plane perpendicular to the length of the ferrite block is of a trapezoid due to the side etching. The resultant side of the trapezoid is inclined by about 45°, as shown in FIG. 15(d). The etching amount can be 50 to 100 μm. Then, after the etching resist 63 is removed from the ferrite block 611, the ferrite block 61 is joined with the other ferrite block 61' at the joint surfaces 62 and 62' by using a glass bonder 66 so as to form a magnetic gap 65 therebetween, as shown in FIG. 15(e). The magnetic gap 65 is also filled with glass. By cutting the bonded block pair at the plane A-A', a head core 68 is produced, as shown in FIG. 15(f).

Figure 15G:
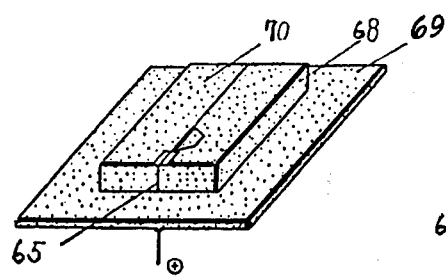
Figure 15H:
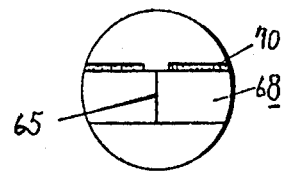
Figure 15I:
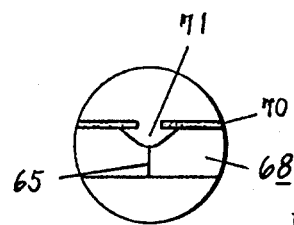

The thus made head core is fixed on a copper plate 69, and is then coated with an etching resist 70, leaving an uncoated portion which is near the magnetic gap 65 on the working surface of the head and which involves the joint portion between the ferrite blocks 61 and 61', and which is on the surface of the ferrite block pair perpendicular to the working surface of the magnetic head, as shown in FIG. 15(g) and 15(h).

Figure 15J:
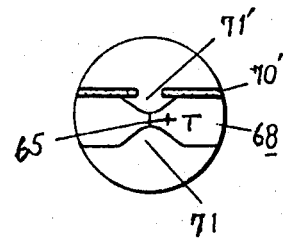
Figure 15K:
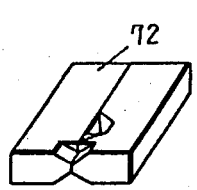
Figure 15L:
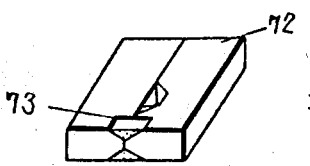

Then, by performing electrolytic etching, the uncoated portion is etched to form a concave portion 71 as shown in FIG. 15(a). Thereby, the length magnetic gap 65 which corresponds to the track width can be controlled or defined. If necessary, similar etching can be carried out at the surface of the joint portion opposite to the joint portion as being etched above, as shown in FIG. 15(j), to define a shorter length T of magnetic gap (narrower track width). Thereby, a head core 72 as shown in FIG. 15(k) is made. Then, a glass is filled in the concave portion of the head core formed by the electrolytic etching.

Then, other known techniques are performed to shape the working surface of the head and to wind a winding on the head core.

FIG. 16 depicts the case when the etching at the joint portion was performed from one side only.

According to the head producing method described above, a magnetic head having a well controlled dimension such as track width and also having a smooth surface can be easily made. Such magnetic head has excellent magnetic properties.

FIG. 17(a) to 17(c) depicts another method of making a magnetic head, by which the track width of the resultant head can be easily controlled precisely. Referring to FIG. 17(a), a ferrite block 81 has a groove 82 to become a magnetic core window, and the surface to become a joint surface is smoothly polished. Reference numeral 83 designates an opposite ferrite block to be joined with the above ferrite. This block 83 also has a joint surface smoothly polished. The polishing of joint surfaces of both the ferrite blocks is performed by mechanical machining and then electrolytic etching to remove deformed layers on the ferrite surfaces if any.

The two ferrite blocks 81 and 83 are joined together, as shown in FIG. 17(b), to form a magnetic gap 84, and are then bonded by glass 85 to form an integrated block pair (gapped bar) 86. Then, as shown in FIG. 17(c), the surface of the gapped bar 86 which involves the working surfaces of resultant plural head cores is partially etched by using etching resist layers and the etchant of this invention to form plural concavities 87. The etching resist layers are coated on the gapped bar 86 to leave uncoated portions at the joint portions of the gapped bar 86 as apparent from FIG. 17(c). The bottom level of each etched concavity 87 is lower than the level of the apex portion (bottom edge of the magnetic gap or top edge of the core window) as shown by the line A-A' in FIG. 17(c). Thereby, the magnetic gap length T (track width) can be easily defined.

After glass is filled in the concavities 87, the gapped bar 86 is cut by planes each of which is perpendicular to the length of the gapped bar 86 (or the length of the groove 82) and involves a portion of each concavity 87, and thereby a head having a rack width T can be formed.

As described hereinabove, the electrolytic etchant of this invention makes it possible to precisely shape a magnetic head by electrolytic etching even if the etching amount is large, which is not possible according to conventional electrolytic etchants or chemical etchants. Further, according to this invention, undesired deformed layers on ferrite surfaces can be easily removed, leaving etched surface having high smoothness. Further, by the magnetic head producing method of this invention using electrolytic etching technique which is unexpected from the technique using conventional etchants, an excellent magnetic head can be produced.

Table 1

| Composition of etchant | Ferrite surface roughness after etching | Does the etchant damage the etching resist? | Etching speed |
|---|---|---|---|
| hydrochloric acid (HCl 35 wt. %) | large | No | high |
| nitric acid (HNO$_3$ 60 wt. %) | large | No | high |
| perchloric acid (HClO$_4$ 60 wt. %) | large | No | high |
| phosphoric acid (H$_3$PO$_4$ 85 wt. %) | large | No | high |
| boric acid (H$_3$BO$_3$ 5 g H$_2$O 100ml) | medium | No | very low |
| chromic anhydride (CrO$_3$ 15 g H$_2$O 100ml) | large | No | high |
| formic acid (HCOOH 90 wt. %) | medium | No | low |
| acetic acid (CH$_3$COOH 99 wt. %) | medium | No | low |
| glycolic acid (CH$_2$OHCOOH 70 wt. %) | medium | No | low |
| oxalic acid ((COOH)$_2$·2H$_2$O 10 g H$_2$O 100ml) | medium | No | medium |
| tartaric acid (C$_2$H$_2$(OH)$_2$(COOH)$_2$ 130 g H$_2$O 100ml) | medium | No | low |
| sulfuric acid (H$_2$SO$_4$ 95 wt. %) | extremely small | Yes | extremely low |
| sulfuric acid 95 ml (H$_2$SO$_4$ 95 wt. %) H$_2$O 5 ml | small | Yes | low |
| sulfuric acid 90 ml (H$_2$SO$_4$ 95 wt. %) H$_2$O 10 ml | small | Yes | low |
| sulfuric acid 80 ml (H$_2$SO$_4$ 95 wt. %) H$_2$O 20 ml | small | Yes | low |
| sulfuric acid 70 ml (H$_2$SO$_4$ 95 wt. %) H$_2$O 30 ml | small | Yes | medium |
| sulfuric acid 60 ml (H$_2$SO$_4$ 95 wt. %) H$_2$O 40 ml | small | Yes | medium |
| sulfuric acid 50 ml (H$_2$SO$_4$ 95 wt. %) H$_2$O 50 ml | large | Yes | high |
| sulfuric acid 50 ml (H$_2$SO$_4$ 95 wt. %) glycerine 50 ml | extremely small | No | extremely low |
| sulfuric acid 90 ml (H$_2$SO$_4$ 95 wt. %) phosphoric acid 10 ml (H$_3$PO$_4$ 85 wt. %) | small | Yes | low |
| sulfuric acid 75 ml (H$_2$SO$_4$ 95 wt. %) phosphoric acid 25 ml (H$_3$PO$_4$ 85 wt. %) | small | Yes | low |
| sulfuric acid 50 ml (H$_2$SO$_4$ 95 wt. %) phosphoric acid 50 ml (H$_3$PO$_4$ 85 wt. %) | small | Yes | medium |
| sulfuric acid 30 ml (H$_2$SO$_4$ 95 wt. %) phosphoric acid 70 ml (H$_3$PO$_4$ 85 wt. %) | medium | Yes | high |
| sulfuric acid 25 ml (H$_2$SO$_4$ 95 wt. %) phosphoric acid 75 ml (H$_3$PO$_4$ 85 wt. %) | large | Yes | high |
| sulfuric acid 50 ml (H$_2$SO$_4$ 95 wt. %) phosphoric acid 25 ml (H$_3$PO$_4$ 85 wt. %) glycerine 25 ml (CH$_2$OHCH(OH)CH$_2$OH 95 wt. %) | small | Yes a little | medium |
| sulfuric acid 34 ml | small | No | medium |

Table 1-continued

| Composition of etchant | Ferrite surface roughness after etching | Does the etchant damage the etching resist? | Etching speed |
|---|---|---|---|
| (H$_2$SO$_4$ 95 wt. %) phosphoric acid 33 ml (H$_3$PO$_4$ 85 wt. %) glycerine 33 ml (CH$_2$OHCH(OH)CH$_2$OH 95 wt. %) | | | |
| sulfuric acid 25 ml (H$_2$SO$_4$ 95 wt. %) phosphoric acid 50 ml (H$_3$PO$_4$ 85 wt. %) glycerine 25 ml (CH$_2$OHCH(OH)CH$_2$OH 95 wt. %) | medium | Yes a little | medium |
| sulfuric acid 25 ml (H$_2$SO$_4$ 95 wt. %) phosphoric acid 25 ml (H$_3$PO$_4$ 85 wt. %) glycerin 50 ml (CH$_2$OHCH(OH)CH$_2$OH 95 wt. %) | small | No | low |
| sulfuric acid 33 ml (H$_2$SO$_4$ 95 wt. %) phosphoric acid 32 ml (H$_3$PO$_4$ 85 wt. %) H$_2$O 2 ml glycerine 33 ml (CH$_2$OHCH(OH)CH$_2$OH 95 wt. %) | small | No | medium |
| sulfuric acid 32 ml (H$_2$SO$_4$ 95 wt. %) phosphoric acid 32 ml (H$_3$PO$_4$ 85 wt. %) H$_2$O 4 ml glycerine 32 ml (CH$_2$OHCH(OH)CH$_2$OH 95 wt. %) | medium | No | high |
| sulfuric acid 30 ml (H$_2$SO$_4$ 95 wt. %) phosphoric acid 30 ml (H$_3$PO$_4$ 85 wt. %) H$_2$O 10 ml glycerine 30 ml (CH$_2$OHCH(OH)CH$_2$OH 95 wt. %) | large | No | high |
| sulfuric acid 34 ml (H$_2$SO$_4$ 95 wt. %) phosphoric acid 33 ml (H$_3$PO$_4$ 85 wt. %) ethyleneglycol 33 ml (HOCH$_2$CH$_2$OH 95 wt. %) | small | No | low |
| sulfuric acid 34 ml (H$_2$SO$_4$ 95 wt. %) phosphoric acid 33 ml (H$_3$PO$_4$ 85 wt. %) dioxane 33 ml (C$_4$H$_8$O$_2$ 95 wt. %) | small | No | low |
| sulfuric acid 34 ml (H$_2$SO$_4$ 95 wt. %) phosphoric acid 33 ml (H$_3$PO$_4$ 85 wt. %) triethylenetetramine 33 ml ((CH$_2$NHCH$_2$CH$_2$NH$_2$)$_2$ 95 wt. %) | small | No | low |
| sulfuric acid 80 ml (H$_2$SO$_4$ 95 wt. %) hydrochloric acid 20 ml (HCl 35 Wt. %) | small | Yes | low |
| sulfuric acid 80 ml (H$_2$SO$_4$ 95 wt. %) nitric acid 20 ml (HNO$_3$ 60 wt. %) | small | Yes | low |
| sulfuric acid 50 ml (H$_2$SO$_4$ 95 wt. %) perchloric acid 50 ml (HClO$_4$ 60 wt. %) | small | Yes | low |
| sulfuric acid 50 ml (H$_2$SO$_4$ 95 wt. %) formic acid 50 ml (HCOOH 90 wt. %) | small | Yes | low |
| sulfuric acid 50 ml (H$_2$SO$_4$ 95 wt. %) acetic acid 50 ml (CH$_3$COOH 99 wt. %) | small | Yes | low |
| sulfuric acid 50 ml | small | Yes | low |

Table 1-continued

| Composition of etchant | Ferrite surface roughness after etching | Does the etchant damage the etching resist? | Etching speed |
|---|---|---|---|
| (H₂SO₄ 95 wt.%) glycollic acid 50 ml (CHOHCOOH 70 wt. %) | | | |
| sulfuric acid 34 ml (H₂SO₄ 95 wt. %) glycolic acid 33 ml (CH₂OHCOOH 70 wt. %) glycerine 33 ml (CH₂OHCH(OH)CH₂OH 95 wt. % | small | No | low |
| sulfuric acid 34 ml (H₂SO₄ 95 wt. %) glycolic acid 33 ml (CH₂OHCOOH 70 wt. %) ethyleneglycol 33 ml (HOCH₂CH₂CH 95 wt. %) | small | No | low |
| sulfuric acid 100 ml (H₂SO₄ 95 wt. %) oxalic acid 3 g | small | Yes | low |
| sulfuric acid 100 ml (H₂SO₄ 95 wt. %) tartaric acid 10 g | small | Yes | low |

Table 2

| Composition | Chemical etchant Ferrite surface roughness after etching | Etching speed |
|---|---|---|
| hydrochloric acid (HCl 35 wt. %) | large | high |
| hydrochloric acid 50 ml (HCl 35 wt. %) H₂O 50 ml | large | low |

[In Tables 1 and 2, the surface roughnesses indicated by "small", "medium" and "large" are defined as follows: <small: less than 0.1 micron, medium: 0.1 to 0.5 micron, large: more than 0.5 micron>. The Etching speeds indicated by "low", "medium" and "high" are defined as follows: <low: less than 0.1 micron/minute, medium: 0.1 to 1 micron/minute, high: more than 1 micron/minute>]

What is claimed is:

1. A method of producing a magnetic head, comprising: preparing a pair of ferrite blocks joined together by glass to form a magnetic gap therebetween; coating an etching resist on one surface of the joined pair of ferrite blocks to leave at least a part of the joint portion between the two ferrite blocks on said one surface uncoated with the etching resist; contacting the ferrite blocks with an etchant comprising an electrolytic liquid which comprises sulfuric acid as a main component and water in such amount that the weight ratio of sulfuric acid to water is between 9:1 and 2:1, so as to electrolytically etch said uncoated part of the joint portion of the two ferrite blocks on said one surface to partially remove the joint portion of the ferrite blocks and thereby define a magnetic track width of the magnetic head; and removing the etching resist.

2. A method of producing a magnetic head according to claim 1, wherein said one surface of the joined ferrite blocks is the surface perpendicular to the working surface of the magnetic head.

3. A method of producing a magnetic head according to claim 1, wherein said one surface of the joined ferrite blocks is the surface involving the working surface of the magnetic head.

4. A method of producing a magnetic head according to claim 1 wherein said electrolytic liquid additionally contains 1/6 to 3 weight parts of an additive selected from the group consisting of glycerine, ethyleneglycol, dioxane and triethylenetetramine on the basis of one weight part of said electrolytic liquid.

5. A method of producing a magnetic head, comprising the steps of:
 (a) preparing a pair of ferrite blocks by grinding a surface on each of said ferrite blocks, a deformed layer being produced on each of said surfaces by said grinding step;
 (b) electrolytically etching each of said surfaces in an electrolytic liquid which comprises sulfuric acid as a main component and water in such amount that the weight ratio of sulfuric acid to water is between 9:1 and 2:1, so as to remove said deformed layer; and
 (c) joining said ferrite blocks with said surfaces facing each other.

6. A method of producing a smooth surface on a ferrite according to claim 5 wherein said electrolytic liquid additionally contains 1/6 to 3 weight parts of an additive selected from the group consisting of glycerine, ethyleneglycol, dioxane and triethylenetetramine on the basis of one weight part of said electrolytic liquid.

* * * * *